US009559850B2

United States Patent
Lorge (10) Patent No.: US 9,559,850 B2
(45) Date of Patent: *Jan. 31, 2017

(54) COMPONENT MANAGEMENT VIA SECURE COMMUNICATIONS

(71) Applicant: EMPIRE TECHNOLOGY DEVELOPMENT LLC, Wilmington (DE)

(72) Inventor: Bradford Michael Lorge, NSW (AU)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,395

(22) Filed: Dec. 14, 2015

(65) Prior Publication Data

US 2016/0112205 A1    Apr. 21, 2016

Related U.S. Application Data

(63) Continuation of application No. 14/358,708, filed as application No. PCT/US2013/052779 on Jul. 30, 2013, now Pat. No. 9,246,689.

(51) Int. Cl.
 *H04L 9/00*     (2006.01)
 *H04L 9/32*     (2006.01)
 (Continued)

(52) U.S. Cl.
 CPC ............ *H04L 9/3247* (2013.01); *H04L 9/30* (2013.01); *H04L 63/0272* (2013.01);
 (Continued)

(58) Field of Classification Search
 CPC ...... H04L 63/08; H04L 63/20; H04L 63/0869; H04L 63/0876; H04L 9/3281; H04L 63/065; H04L 63/0272; H04L 9/30; H04L 63/146; H04L 9/3247; H04L 63/1466
 (Continued)

(56) References Cited

U.S. PATENT DOCUMENTS 6,704,873 B1    3/2004    Underwood
7,086,086 B2    8/2006    Ellis
 (Continued)

FOREIGN PATENT DOCUMENTS

EP    2119606 B1    7/2012

OTHER PUBLICATIONS

"CAN bus," accessed at http://web.archive.org/web/20130703082344/http:/len.wikipedia.org/wiki/CAN_bus, accessed on May 14, 2014, pp. 1-17.
 (Continued)

Primary Examiner — Hosuk Song
(74) Attorney, Agent, or Firm — Turk IP Law, LLC (57) ABSTRACT

Technologies are generally described for establishing secure communications to manage components of a control system. In some examples, upon receiving a request from a component to join a cluster of components, a class and instance of the component may be verified to authorize the component. A command to be transmitted from the component to another component of the cluster may be marked with a signature, where restrictions may be placed on a type of command that a particular class of component may transmit to one or more other classes of components. Based on the signature, a secure communication path between the components may be established by creating an encrypted virtual private network (VPN). The command may then be transmitted from the component to the other component through the secure communication path.

22 Claims, 7 Drawing Sheets

(51) Int. Cl.
*H04L 29/06* (2006.01)
*H04L 9/30* (2006.01)

(52) U.S. Cl.
CPC ...... *H04L 63/1466* (2013.01); *H04L 2209/24* (2013.01); *H04L 2209/72* (2013.01)

(58) Field of Classification Search
USPC .............. 713/168–171, 176, 180; 726/14–15
See application file for complete search history.

(56) References Cited

U.S. PATENT DOCUMENTS

| | | | |
|---|---|---|---|
| 7,127,611 | B2 | 10/2006 | Dabbish et al. |
| 7,137,142 | B2 | 11/2006 | Puhl et al. |
| 7,287,269 | B2 * | 10/2007 | Burton ................... H04L 63/08 380/28 |
| 7,590,842 | B2 | 9/2009 | Okamoto |
| 7,593,124 | B1 | 9/2009 | Sheng et al. |
| 7,809,953 | B2 * | 10/2010 | Little .................... G06F 21/335 713/182 |
| 7,886,153 | B2 | 2/2011 | Miyazawa |
| 7,913,080 | B2 * | 3/2011 | Taniguchi ........... H04L 63/0272 380/229 |
| 8,458,462 | B1 * | 6/2013 | Hanna ................... H04L 63/10 713/156 |
| 9,130,921 | B2 * | 9/2015 | Boubez ................. H04L 63/08 |
| 9,246,689 | B2 * | 1/2016 | Lorge ................. H04L 63/0272 |
| 2002/0152299 | A1 | 10/2002 | Traversat et al. |
| 2009/0041252 | A1 | 2/2009 | Hanna |

OTHER PUBLICATIONS

Barry, K., "Can Your Car Be Hacked?," accessed at http://web.archive.org/web/20130705225404/http:/lwww.caranddriver.com/features/can-your-car-be-hacked-feature, pp. 1-9 (Jul. 2011).
Nice, K "How Car Computers Work," accessed at http:/lweb.archive.org/web/20130723163404/http:/lauto.howstuffworks.com/under-the-hood/trends-innovations/car-computer.htm, accessed on May 14, 2014, pp. 2.
Wasicek, A., "Copy Protection for Automotive Electronic Control Units using Authenticity Heartbeat Signals," 10th IEEE International Conference on Industrial Informatics, pp. 821-826 (2012).
Wolf, M et al., "State of the Art: Embedding Security in Vehicles," Hindawi Publishing Corporation, vol. 2007, pp. 16 (2006).
Wolf, W., et al., "Secure In-Vehicle Communication," Embedded Security in Cars, pp. 95-109 (2006).
International Search Report with Written Opinion for International Application No. PCT/US2013/052779 mailed on Feb. 18, 2014.

* cited by examiner

COMPUTER PROGRAM PRODUCT 700

SIGNAL BEARING MEDIUM 702

704 AT LEAST ONE OF

ONE OR MORE INSTRUCTIONS FOR RECEIVING A REQUEST TO JOIN A FIRST COMPONENT TO A CLUSTER OF COMPONENTS;
　　ONE OR MORE INSTRUCTIONS FOR VERIFYING THE FIRST COMPONENT BASED ON A CLASS OF THE COMPONENT;
　　ONE OR MORE INSTRUCTIONS FOR MARKING A COMMAND FROM THE FIRST COMPONENT WITH A SIGNATURE;
　　ONE OR MORE INSTRUCTIONS FOR ESTABLISHING A SECURE COMMUNICATION PATH BETWEEN THE FIRST COMPONENT AND THE SECOND COMPONENT BASED ON THE SIGNATURE; AND/OR
　　ONE OR MORE INSTRUCTIONS FOR TRANSMITTING THE COMMAND BETWEEN THE FIRST COMPONENT AND THE SECOND COMPONENT THROUGH THE SECURE COMMUNICATION PATH.

| COMPUTER-READABLE MEDIUM 706 | RECORDABLE MEDIUM 708 | COMMUNICATIONS MEDIUM 710 |

FIG. 7

COMPONENT MANAGEMENT VIA SECURE COMMUNICATIONS

CROSS REFERENCE TO RELATED APPLICATIONS

This Application is a continuation under 35 U.S.C. §120 of U.S. patent application Ser. No. 14/358,708 filed on May 15, 2014, now U.S. Pat. No. 9,246,689, which is the U.S. National Stage filing under 35 U.S.C. §371 of PCT Application Ser. No PCT/US13/052779 filed on Jul. 30, 2013, by the same inventors, commonly assigned herewith. The disclosures of the U.S. Patent Application and the PCT Application are hereby incorporated by reference in their entireties.

BACKGROUND

Unless otherwise indicated herein, the materials described in this section are not prior art to the claims in this application and are not admitted to be prior art by inclusion in this section.

An operational control system may include a controller and one or more components, where the controller may manage, direct, or regulate commands transmitted by the one or more components. Operational control systems may be implemented in transportation environments (e.g., automobiles, trains, airplanes, and ships), smart homes, and power stations, for example. Conventional operational control systems have limited or non-existent component separation or security (apart from physical security, such as automobile alarm systems). The lack of component separation may allow transmission and execution of inappropriate commands at a component. The lack of security and authentication may further result in a man-in-the-middle attack or unauthorized eavesdropping.

SUMMARY

The present disclosure generally describes methods, apparatus, systems, devices, and/or computer program products related to establishing secure communications to manage components of a control system.

According to some examples, a method for establishing secure communications to manage components of a control system is provided. The method may include receiving a request to join a first component to a cluster of components, verifying the first component based on a class of the first component, and marking a command from the first component with a signature. The method may also include establishing a secure communication path between the first component and a second component from the duster based on the signature and transmitting the command between the first component and the second component through the secure communication path.

According to other examples, a computing device of a vehicle configured to establish secure communications to manage components of a control system is described. The computing device may include a memory and a processor coupled to the memory. The processor may execute an application in conjunction with instructions stored in the memory, where the application is configured to receive a request to join a first component to a cluster of components. The application may also be configured to verify the first component based on a class of the first component and match the class to a predetermined list of expected classes including a critical operation class, an entertainment class, an environment class, and a peripheral class. The application may be further configured to mark a command from the first component with a signature and form a secure connection such as an encrypted virtual private network (VPN) tunnel using a public key, a private key of the first component, and another private key of a second component from the cluster. The application may be further configured to establish a secure communication path between the first component and the second component within the cluster based on the signature using the encrypted VPN. The application may be further configured to transmit the command between the first component and the second component through the secure communication path.

According to further examples, an operational control system configured to establish secure communications to manage components may be described. The operational control system may include a controller, a first component, and a second component executing a distributed application. The application may be configured to receive a request to join the first component to a cluster of components and verify the first component based on a class of the first component. The application may also be configured to match the class to a predetermined list of excepted classes including a critical operation class, an entertainment class, an environment class, and a peripheral class and mark a command from the first component with a signature. The application may be further configured to form an encrypted virtual private network (VPN) tunnel using a public key, a private key of the first component, and another private key of the second component from the cluster. The application may be further configured to establish a secure communication path between the first component and the second component within the cluster based on the signature using the encrypted VPN. The application may be further configured to transmit the command between the first component and the second component through the secure communication path.

According to yet further examples, a computer readable storage medium with instructions stored thereon for establishing secure communications to manage components of a control system is described. The instructions may include receiving a request to join a first component to a cluster of components and verifying the first component based on a class of the first component. The instructions may also include matching the class to a predetermined list of expected classes, where the expected classes may include a critical operation class, an entertainment class, an environment class, and a peripheral class, and marking a command from the first component with a signature. The instructions may further include forming an encrypted virtual private network (VPN) tunnel using a public key, a private key of the first component, and another private key of a second component from the cluster. The instructions may further include establishing a secure communication path between the first component and the second component within the cluster based on the signature using the encrypted VPN. The instructions may yet further include transmitting the command between the first component and the second component through the secure communication path.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to establishing secure communications to manage components of a control system.

Briefly stated, technologies are generally provided to establish secure communications to manage components of a control system. In some examples, upon receiving a request from a component to join a cluster of components, a class and instance of the component may be verified to authorize the component. A command to be transmitted from the component to another component of the cluster may be marked with a signature, where restrictions may be placed on a type of command that a particular class of component may transmit to one or more other classes of components. Based on the signature, a secure communication path between the components may be established by creating an encrypted virtual private network (VPN). The command may then be transmitted from the component to the other component through the secure communication path.

Figure 1:
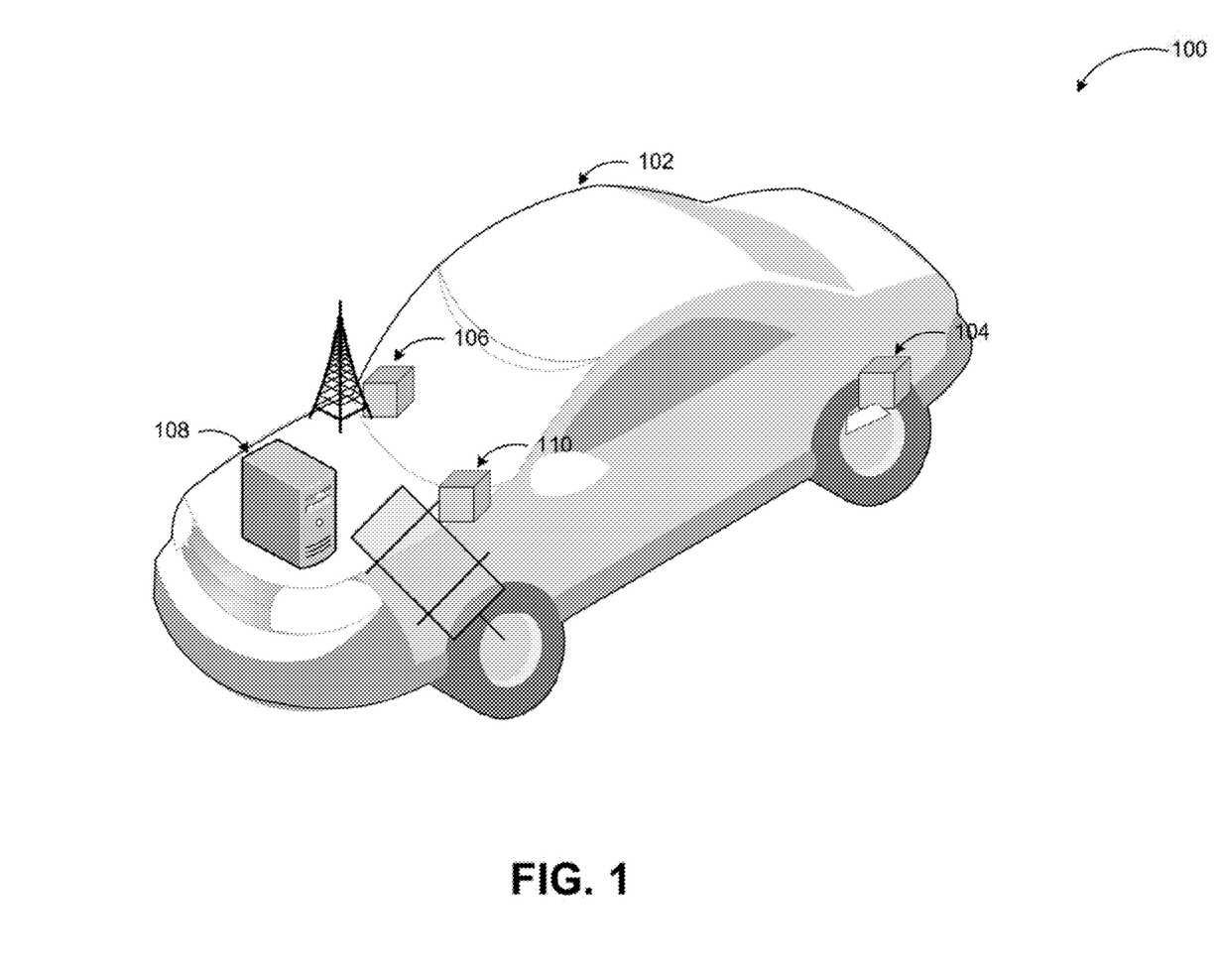
FIG. 1 illustrates a vehicle model to establish secure communications to manage components of a control system.

FIG. 1 illustrates a vehicle model to establish a secure communications system to manage components of a control system, arranged in accordance with at least some embodiments described herein.

As shown in a diagram 100, a system, such as an automobile 102, according to some example embodiments, may include a controller 108, a cluster of components (e.g., a radio antenna 106 and an engine 110), and a component (e.g., a deceleration subsystem 104). The controller 108, the cluster of components and the component may each have command and communication subcomponents including memory, processor, and networking hardware to execute commands, manage operations associated with the commands, and communicate with each other. The cluster of components and the component may each also have been manufactured to include a unique public and private key and a class type.

The controller 108 may receive a request from the deceleration subsystem 104 to join the cluster of components (e.g., the radio antenna 106 and the engine 110) in response to an installation of the deceleration subsystem 104. A public key and a class of the deceleration subsystem 104 may be received within the request. The controller 108 may verify the class and instance of the deceleration subsystem 104 before marking a command sent by the deceleration subsystem 104 to another component with a signature. The class may be matched with a pre-determined list of expected classes to verify. The controller 108 may use a system key to sign the public key and the class of the deceleration subsystem 104 to generate the signature. The generation of the signature may prevent a transmission and execution of a command associated with the deceleration subsystem 104 lacking the signature.

Subclasses may include multi-component units that reside within the classes. For example, the acceleration system may be within the critical operation class or entertainment components within a communication class. Class may also mean "accelerator" or "steering control unit" in the vehicle example. This categorization may enable functionality-tuned control. For example, following may be thought of as subclasses: COMPONENT->ENTERTAINMENT COMPONENT->RADIO/MEDIA CENTRE->Brand Y Model X.

For example, the deceleration subsystem 104 may be in a critical operation class of the control system, a class that may manage critical driving functions. As a result, the generated signature may authorize the deceleration subsystem to transmit a command to the engine 110, another critical operation class component with which the deceleration subsystem needs to communicate with to perform functions of the deceleration subsystem. Alternately, the generated signature may not authorize the deceleration subsystem 104 to transmit a command to the radio antenna 106. The radio antenna 106 may be an entertainment class component and the deceleration subsystem does not need to (need not) be in communication with the radio antenna to perform the functions of the deceleration subsystem. Other classes of the control system in an automobile may include an environment class and a peripheral class.

The signature may be transmitted back to the deceleration subsystem 104 with the system key and stored in the system, activating a predetermined setting to disregard another join request from the deceleration subsystem 104 and enabling the deceleration subsystem 104 to operate within the system. Once the command of the deceleration subsystem 104 has been marked with a signature, a secure communication path may be established between the deceleration subsystem 104 and the engine 110 based on the signature through a virtual private network (VPN). The VPN may be encrypted using a public key, a private key of the deceleration subsystem 104, and a private key of the engine 110. The command of the deceleration subsystem 104 may then be transmitted to the engine 110 through the secure communication path over wired and/or wireless media.

Conventional operational control systems may not be configured to ensure that a component has an authorization to transmit a certain type of command to one or more other components. Thus, such systems cannot prevent a malicious component from compromising the operational control system and its individual components. Increasingly, components of operational control systems may employ standardized processing and communications techniques. For example, standard wireless or wired communications protocols may be employed for exchange of data among various components of an operational control systems (e.g., between navigation sub-system and control sub-system). Depending on the communication technique and the medium used for communication among the various components, an operational control system may be open to attacks or miscommunication. The risk may not be limited to external attackers, but a compromised component being coupled to the operational control system may also present a risk to other components. Example embodiments may prevent execution of unsigned commands transmitted by non-authorized (potentially malicious) components to the one or more components of the control system. Embodiments may further prevent eavesdropping by an unauthorized source by creation of the encrypted virtual private network (VPN).

Figure 2:
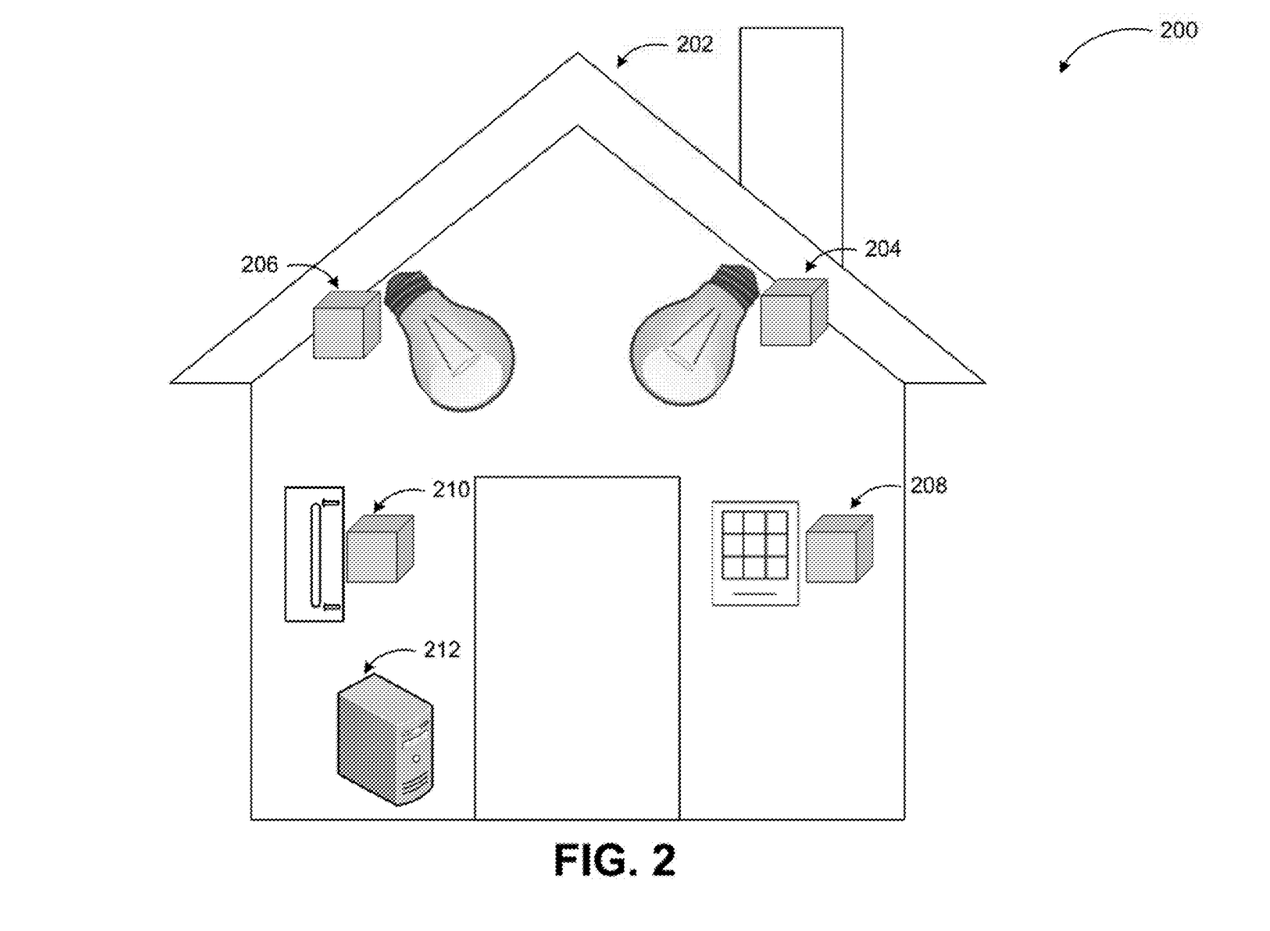
FIG. 2 illustrates a smart dwelling model to establish secure communications to manage components of a control system.

FIG. 2 illustrates a smart dwelling model to establish secure communications to manage components of a control system, arranged in accordance with at least some embodiments described herein.

As shown in a diagram 200, a system may include a controller 212 that may manage a cluster of components within a smart dwelling 202. The cluster of components may include a first lighting control unit 204, a second lighting control unit 206, a security lock unit 208, and an air conditioning unit 210. The controller 212 and the cluster of components may each have command and communication subcomponents including memory, processor, and networking hardware to execute commands, manage operations associated with the commands, and communicate with each other. Each component within the cluster of components may also have been manufactured to include a unique public and private key and a class type.

In addition to a controller receiving a request for a component to join a cluster of components, as discussed in FIG. 1, the controller may alternately receive a request to remove a component from a cluster of components. For example, the controller 212 may mark a command with a signature of the first lighting control unit 204 to reset the cluster of components to an unsigned state in association with the first lighting control unit upon detecting removal of the first lighting control unit 204. The controller 212 may use a system key to generate the signature. An optional system identification or revised identification may also be used to generate the signature. The controller 212 may transmit the command to the cluster of components through a secure communication path established through an encrypted VPN. The installation process may then be reset with a new public key, system identification, or revised identification.

A VPN may extend a private network across a public network, such as the Internet. It may enable a system or components within a system to transmit commands across shared or public networks as if the system or components were directly connected to the public network, while benefiting from the functionality, security and management policies of the private network. Components within the system may establish an encrypted VPN using their private keys in conjunction with a public key. The VPN may prevent man in the middle attacks similar to other secure protocols, such as SSL and TLS.

Figure 3:
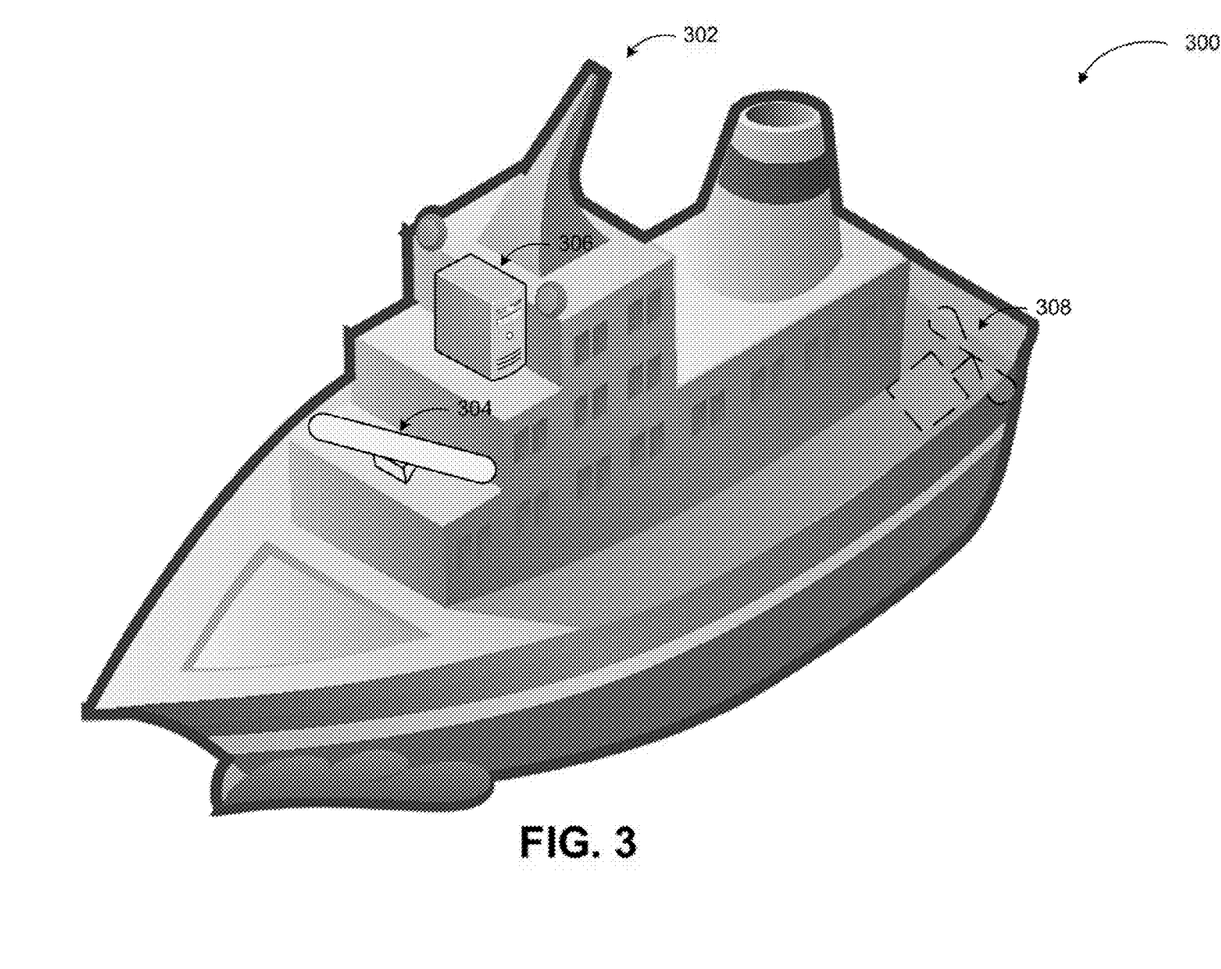
FIG. 3 illustrates another vehicle model to establish secure communication to manage components of a control system.

FIG. 3 illustrates another vehicle model to establish secure communication to manage components of a control system, arranged in accordance with at least some embodiments described herein.

As shown in a diagram 300, a system of a ship 302 may include a controller 306 and a cluster of components. The cluster of components may include a navigation system, a ship-wide communication system, a power control system, a radar device 304, a propulsion system 308, and similar ones.

In an example scenario, the ship's operational control systems may be configured to allow a direct communication line between the radar device 304 and the propulsion system 308. This may be for the purposes of initiating emergency maneuvering without the delay of another system or human interference in case of an emergency. For example, if the radar detects an obstruction (e.g., underwater rocks) in close proximity, it may be enabled to transmit an emergency command to the propulsion system 308 such that the ship may be placed in reverse speed immediately to avoid a collision.

According to the example scenario, the radar device 304 may need to transmit a command to the propulsion system 308. The command of the radar device 304 may be marked with a signature generated by the main control system of the ship 302 upon confirming the radar device 304, its class, and classes of other components allowed to receive commands from the radar device 304. The propulsion system 308 may determine an authority of the radar device 304 to transmit the command to the propulsion system 308 through verification of the signature. If the radar device 304 is not authorized, the command may not be executed. If the radar device 304 is authorized, the command may be executed at the propulsion system 308.

Figure 4:
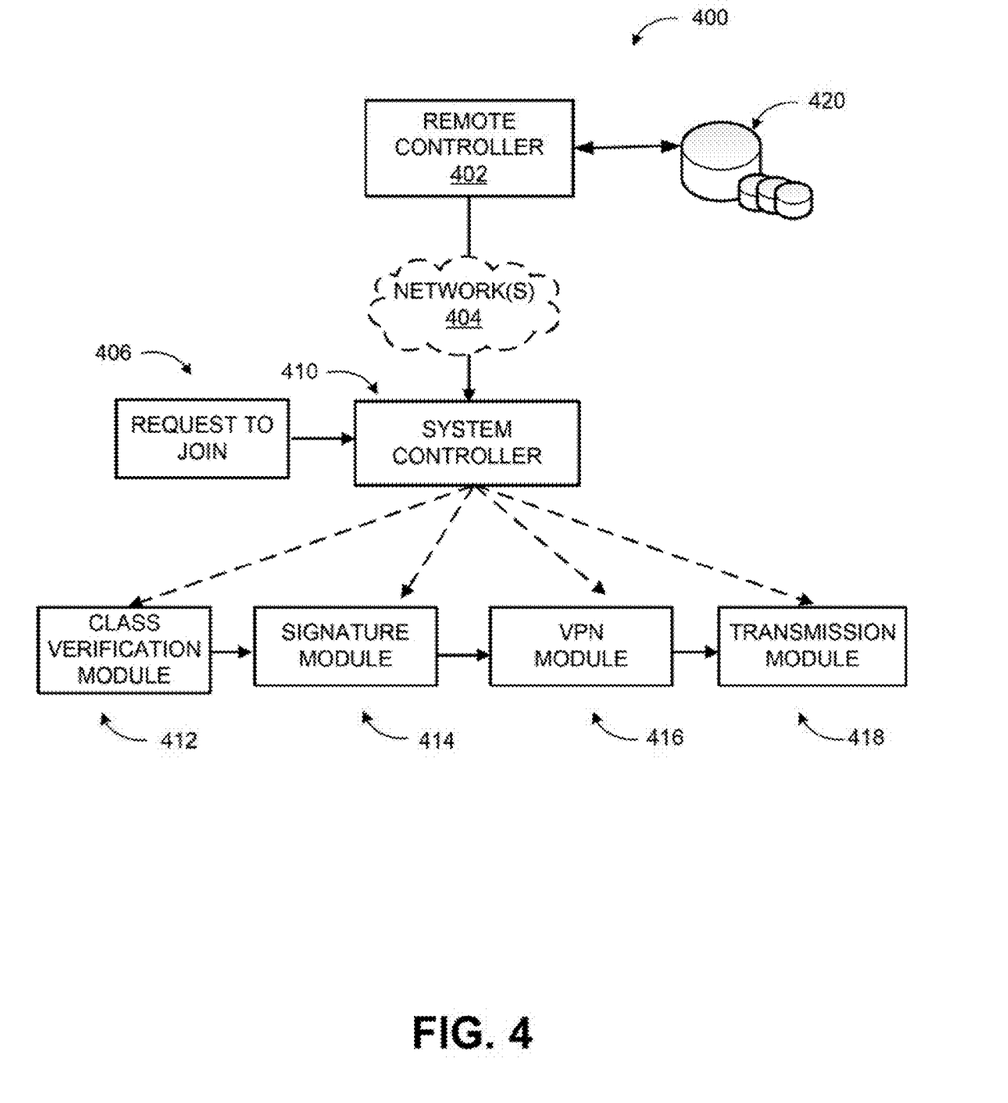
FIG. 4 illustrates an example system to establish secure communications to manage components of a control system.

FIG. 4 illustrates an example system to establish secure communications to manage components of a control system, arranged in accordance with at least some embodiments described herein.

In a system 400, different functionalities of an operational control system are shown as distinct modules, which may include a controller 410, a class verification module 412, a signature module 414, a virtual private network (VPN) module 416, and a transmission module 418. In various implementation scenarios, the modules may be implemented individually or in various combinations depending on system type and configuration. The controller 410 may be operated by human control, or may be directed by a remote controller 402 via network 404. Data associated with controlling the different processes of establishing secure communications to manage components of a control system may be stored at and/or received from data stores 420.

The controller 410 may receive a request 406 from a component to join a cluster of components within the system 400 upon installation of the component to the system. A public key and a class of the component may be received within the request or looked up in a table. The class verification module 412 may verify the class and instance of the component by matching the component with a predetermined list of expected classes to verify. Within a vehicle model, for example, the expected classes may include a critical operation class, an entertainment class, an environment class, and a peripheral class. The critical operation class may include an accelerator unit, a brake unit, a steering unit, and a cruise control unit. The entertainment class may include a CD player, a DVD player, a cassette player, a navigation unit, a speaker system, and a display unit. The environment class may include an air conditioning unit, a seat heater unit, a seat cooler unit, a window control unit, and a sun shade control unit. The peripheral class may include a lighting control unit, a sunroof control unit, and a turn signal control unit. Components of one class may interact with components in one or more other classes, but they may not be authorized to transmit a command to the components in the one or more classes unless the command may be necessary to perform a function.

The signature module 414 may use a system key to sign the public key and the class of the component to generate a signature to mark a command of the component. An optional system identification or revised identification may also be used in conjunction with the system key generate the signature. The generation of the signature, may prevent a transmission and execution of a command associated with the component lacking the signature. The signature may be transmitted back to the component with the system key and stored in the system, activating a predetermined setting to disregard another join request from the component and enabling the component to operate within the system.

Once the command of the component has been marked with a signature, a secure communication path may be established between the component and another component within the cluster of components based on the signature through the VPN module 416. A VPN may be encrypted using a public key, a private key of the first component, and a private key of the other component within the cluster of components. The command of the component may then be transmitted to the other component within the cluster of components through the secure communication path using the transmission module 418.

The examples in FIGS. 1 through 4 have been described using specific model systems and processes for establishing secure communications to manage components of a control system. Embodiments for establishing secure communications to manage components of a control system are not limited to the specific model systems such as cars, trains, ships, and similar vehicles or dwellings and processes according to these examples.

Figure 5:
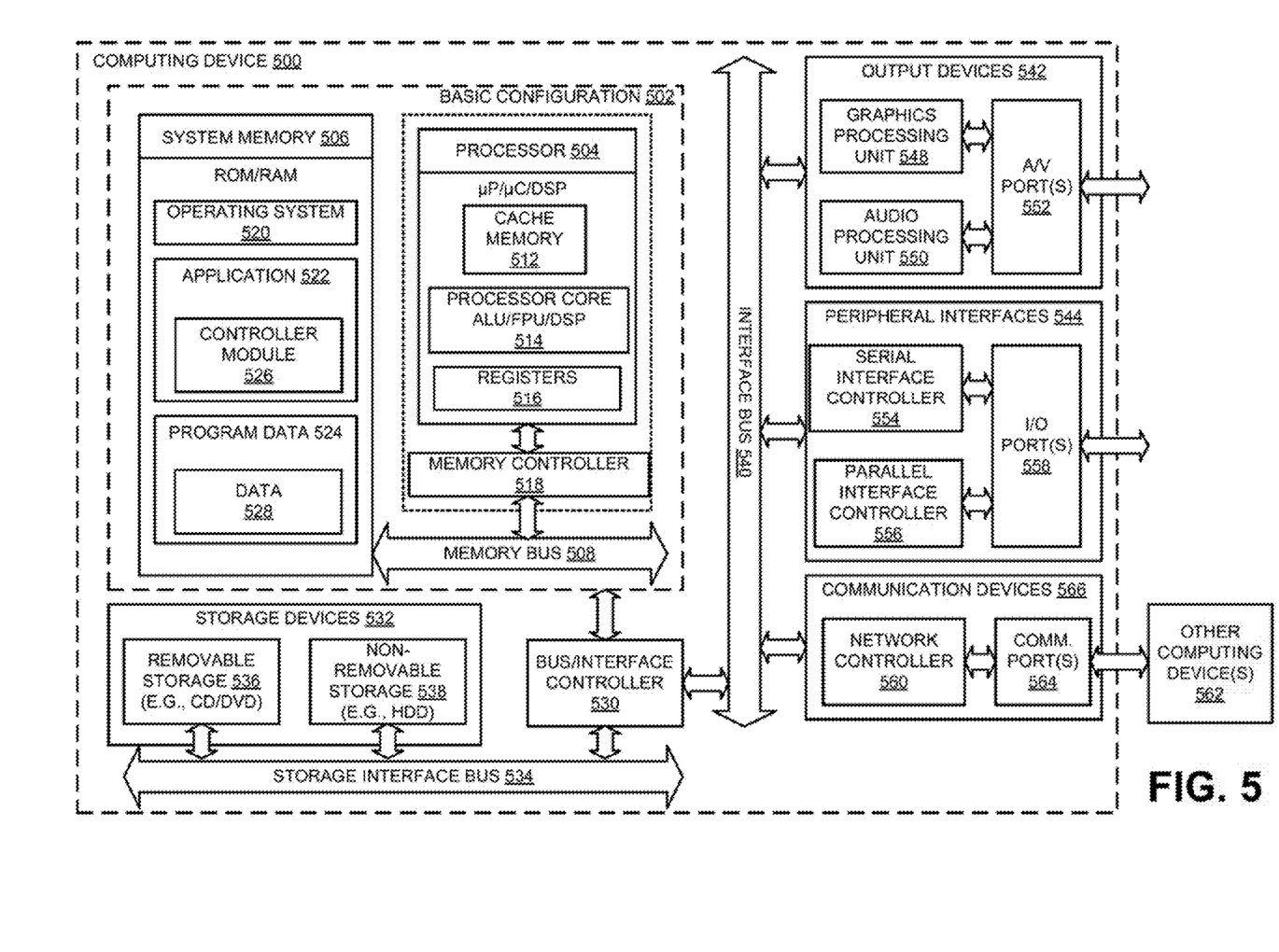
FIG. 5 illustrates a general purpose computing device, which may be used to establish secure communications to manage components of a control system.

FIG. 5 illustrates a general purpose computing device 500, which may be used to establish secure communications to manage components of a control system, arranged in accordance with at least some embodiments described herein.

For example, the computing device 500 may be used as a server, desktop computer, portable computer, smart phone, special purpose computer, or similar device such as a controller, a new component, a cluster of existing components in an operational system including a vehicle and a smart dwelling. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The application 522 may include a controller module 526, which may be an integral part of the application 522 or a separate application on its own. The controller module 526 may establish secure communications to manage components of a control system. Furthermore, the controller module may manage a class verification module, a signature module, a virtual private network (VPN) module, and a transmission module, as described herein. The program data 524 may include, among other data, data 528 related to command execution, operation management, and communications between components, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for establishing secure communications to manage components of a control system. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
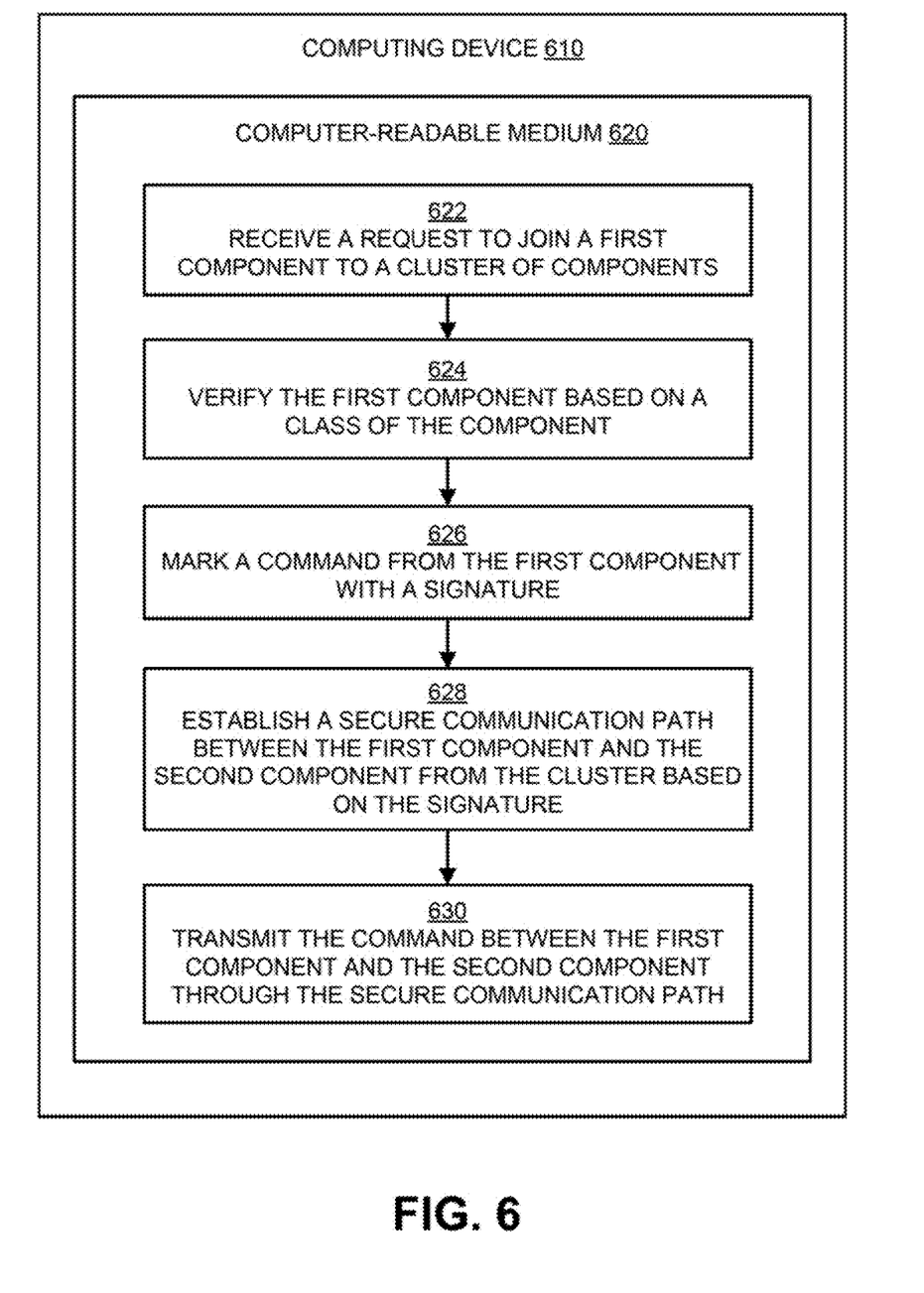
FIG. 6 is a flow diagram illustrating an example method that may be performed by a computing device such as the computing device in FIG. 4.

FIG. 6 is a flow diagram illustrating an example method that may be performed by a computing device such as the computing device in FIG. 5, arranged in accordance with at least some embodiments described herein.

Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process for establishing secure communications to manage components of a control system may begin with block 622, "RECEIVE A REQUEST TO JOIN A FIRST COMPONENT TO A CLUSTER OF COMPONENTS", where a first component (e.g., the radio antenna 106) may join a cluster of components as shown in diagram 100 of FIG. 1. The controller 108 of the control system, may receive a public key and a class of the first component from the first component within the request to join.

Block 622 may be followed by block 624, "VERIFY THE FIRST COMPONENT BASED ON A CLASS OF THE COMPONENT", where the controller 108 may verify the class of the component (e.g., the radio antenna 106) as shown in diagram 100 or FIG. 1. To verify the class, the component may be compared to a predetermined list of expected class. Within a vehicle model, expected classes may include a critical operation class, an entertainment class, an environment class, and a peripheral class, for example.

Block 624 may be followed by block 626, "MARKING A COMMAND FROM THE FIRST COMPONENT WITH A SIGNATURE", where the controller 108 may use a system key to sign the public key and the class of the first component to generate the signature. An optional system identification or revised identification may also be used in conjunction with the system key to generate the signature.

Block 626 may be followed by block 628, "ESTABLISH A SECURE COMMUNICATION PATH BETWEEN THE FIRST COMPONENT AND A SECOND COMPONENT FROM THE CLUSTER BASED ON THE SIGNATURE", where the first component (e.g., the deceleration subsystem 104) and the second component (e.g., the engine 110) may be coupled to the controller 108 through a virtual private network (VPN) in diagram 100 of FIG. 1 to establish a secure communication path. The VPN may be established using a public key, a private key of the first component, and a private key of the second component from the cluster.

Block 628 may be followed by block 630, "TRANSMIT THE COMMAND BETWEEN THE FIRST COMPONENT AND THE SECOND COMPONENT THROUGH THE SECURE COMMUNICATION PATH", where the command may be transmitted from the first component (e.g., the deceleration subsystem 104) to the second component (e.g., the engine 110) through the secure communication path.

The blocks included in the above described process are for illustration purposes. Establishing secure communications to manage components of a control system may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
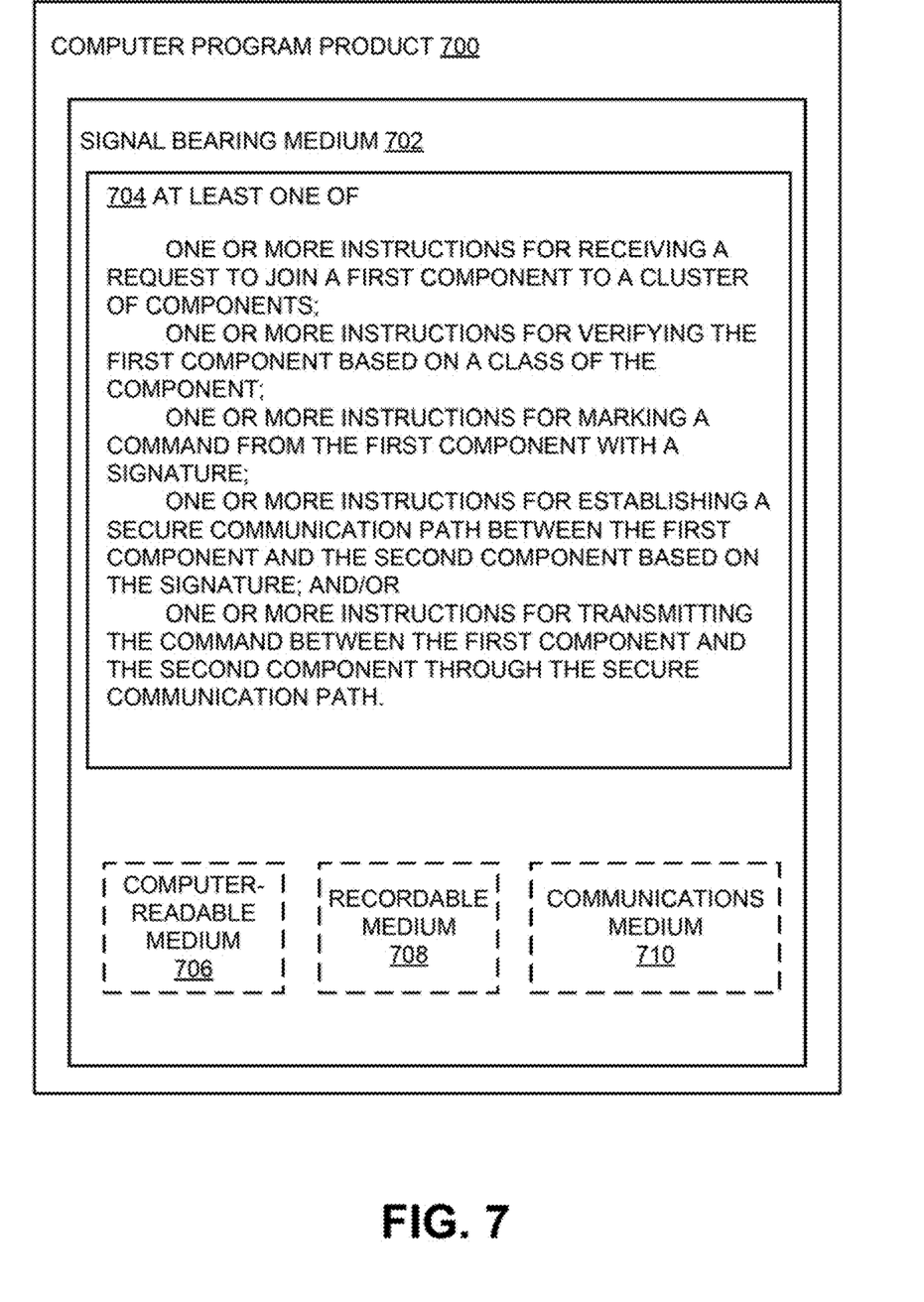
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, a controller module 526 executed on the processor 504 may undertake one or more of the tasks shown in FIG. 7 in response to the instructions 704 conveyed to the processor 504 by the signal bearing medium 702 to perform actions associated with establishing secure communications to manage components of a control system as described herein. Some of those instructions may include, for example, instructions for receiving a request to join a first component to a cluster of components, verifying the first component based on a class of the first component, marking a command from the first component with a signature, establishing a secure communication path between the first component and the second component based on the signature, and transmitting the command between the first component and the second component through the secure communication path according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 of FIG. 5 by an RF signal bearing medium, where the signal bearing medium 702 is conveyed by the wireless communications medium 710 (e.g., a wireless communications medium conforming with the IEEE 802.11 standard).

According to some examples, a method for establishing secure communications to manage components of a control system is provided. The method may include receiving a request to join a first component to a cluster of components, verifying the first component based on a class of the first component, and marking a command from the first component with a signature. The method may also include establishing a secure communication path between the first component and a second component from the cluster based on the signature and transmitting the command between the first component and the second component through the secure communication path.

According to other examples, an encrypted virtual private network (VPN) tunnel within which to establish the secure communication path may be formed using a public key, a private key of the first component, and another private key of the second component. A system key may be stored to generate the signature. The request may be detected in response to an installation of the first component and the public key and the class of the first component may be received within the request. The class may be determined to match a predetermined list of expected classes and the signature may be generated using the system key to sign the public key and the class of the first component. The signature may be transmitted back to the first component and stored, activating a predetermined setting to disregard another join request from the first component and enabling the first component to operate within an operational control system.

According to further examples, a removal request may be received to remove the first component from an operational control system and a removal of the first component may be detected. Another command may be marked with the signature to reset the cluster to an unsigned state in association with the first component and the other command may be transmitted to the cluster. When matching the class to a predetermined list of expected classes, the expected classes may include a critical operation class, an entertainment class, an environment class, and a peripheral class. Transmission of another command associated with the first component lacking the signature may be prevented and execution of another command associated with the first component lacking the signature may be prevented.

According to some embodiments, a computing device of a vehicle configured to establish secure communications to manage components of a control system is described. The computing device may include a memory and a processor coupled to the memory. The processor may execute an application in conjunction with instructions stored in the memory, where the application is configured to receive a request to join a first component to a cluster of components. The application may also be configured to verify the first component based on a class of the first component and match the class to a predetermined list of expected classes including a critical operation class, an entertainment class, an environment class, and a peripheral class. The application may be further configured to mark a command from the first component with a signature and form an encrypted virtual private network (VPN) tunnel using a public key, a private key of the first component, and another private key of a second component from the cluster. The application may be further configured to establish a secure communication path between the first component and the second component within the cluster based on the signature using the encrypted VPN. The application may be further configured to transmit the command between the first component and the second component through the secure communication path.

According to other embodiments, the application may be configured to mark a sequence with the signature and transmit the sequence with the command from the first component to the second component to prevent a replay attack. An authority of the first component to transmit the command to the second component may be determined. The signature and the sequence may be verified at the second component and the command may be executed at the second component in response to determining the first component having the authority. The critical operation class may include an accelerator unit, a brake unit, a steering unit, and a cruise control unit. The entertainment class may include a CD player, a DVD player, a cassette player, a navigation unit, a speaker system, and a display unit. The environment class may include an air conditioning unit, a seat heater unit, a seat cooler unit, a window control unit, and a sun shade control unit. The peripheral class may include a lighting control unit, a sunroof control unit, and a turn signal control unit.

According to some examples, an operational control system configured to establish secure communications to manage components may be described. The operational control system may include a controller, a first component, and a second component executing a distributed application. The application may be configured to receive a request to join the first component to a cluster of components and verify the first component based on a class of the first component. The application may also be configured to match the class to a predetermined list of excepted classes including a critical operation class, an entertainment class, an environment class, and a peripheral class and mark a command from the first component with a signature. The application may be further configured to form an encrypted virtual private network (VPN) tunnel using a public key, a private key of the first component, and another private key of the second component from the cluster. The application may be further configured to establish a secure communication path between the first component and the second component within the cluster based on the signature using the encrypted VPN. The application may be further configured to transmit the command between the first component and the second component through the secure communication path.

According to other examples, the application may be further configured to detect the request in response to an installation of the first component and receive the public key and the class of the first component within the request. The class may be determined to match a predetermined list of expected classes. The signature may be generated using the system key to sign the public key and the class of the first component and the signature may be transmitted back to the first component and stored. A predetermined setting may be activated to disregard another join request from the first component and the first component may be enabled to operate within the operational control system.

According to further examples, the application may be further configured to receive a removal request to remove the first component from the operational control system and detect a removal of the first component. Another command may be marked with the signature to reset the cluster to an unsigned state in association with the first component and the other command may be transmitted to the cluster. A transmission of another command associated with the first component lacking the signature may be prevented and execution of another command associated with the first component lacking the signature may be prevented. A sequence may be marked with the signature and the sequence with the command from the first component may be transmitted to the second component to prevent a replay attack. An authority of the first component to transmit the command to the second component may be determined. The signature and the sequence may be verified at the second component and the command may be executed at the second component in response to determining the first component having the authority.

According to some embodiments, a computer readable storage medium with instructions stored thereon for establishing secure communications to manage components of a control system is described. The instructions may include receiving a request to join a first component to a cluster of components and verifying the first component based on a class of the first component. The instructions may also include matching the class to a predetermined list of expected classes including: a critical operation class, an entertainment class, an environment class, and a peripheral class and marking a command from the first component with a signature. The instructions may further include forming an encrypted virtual private network (VPN) tunnel using a public key, a private key of the first component, and another private key of a second component from the cluster. The instructions may further include establishing a secure communication path between the first component and the second component within the cluster based on the signature using the encrypted VPN. The instructions may further include transmitting the command between the first component and the second component through the secure communication path.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation, or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices.

A typical data processing system may be implemented utilizing any suitable commercially available components, such as those typically found in operational control and secure communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to establish secure communications to manage components of a control system, the method comprising:
  receiving a request to join a first hardware component to a cluster of hardware components;
  verifying the first hardware component based on a class of the first hardware component by matching the class to a predetermined list of expected classes;
  generating a signature using a system key to sign a public key and the class of the first hardware component;
  marking a command from the first hardware component with the signature;
  establishing a secure communication path between the first hardware component and a second hardware component from the cluster based on the signature;
  transmitting the command between the first hardware component and the second hardware component through the secure communication path; and
  preventing a transmission and an execution of another command associated with the first hardware component in response to a determination that the other command lacks the signature.

2. The method according to claim 1, further comprising:
restricting a type of command that the first hardware component is allowed to send to the second hardware component belonging to the class different from the class of the first hardware component.

3. The method according to claim 1, further comprising:
forming an encrypted virtual private network (VPN) tunnel within which to establish the secure communication path using the public key, a private key of the first hardware component, and another private key of the second hardware component.

4. The method according to claim 1, further comprising:
storing the system key to generate the signature.

5. The method according to claim 4, further comprising:
detecting the request in response to an installation of the first hardware component;
receiving the public key and the class of the first hardware component within the request; and
determining the class to match the predetermined list of expected classes.

6. The method according to claim 5, further comprising:
transmitting the signature back to the first hardware component;
storing the signature;
activating a predetermined setting to disregard another join request from the first hardware component; and
enabling the first hardware component to operate within an operational control system.

7. The method according to claim 1, further comprising:
matching the class to the predetermined list of expected classes including: a critical operation class, an entertainment class, an environment class, and a peripheral class.

8. A system to establish secure communications to manage components of a control system, the system comprising:
a controller configured to receive a request to join a first component to a cluster of components within the system;
a class verification module configured to verify the first component based on a class of the first component by matching the class to a predetermined list of expected classes;
a signature module configured to generate a signature for marking the command from the first component; wherein a type of command that the first component is allowed to send to a second component belonging to a class different from the class of the first component is restricted;
a virtual private network module configured to establish a secure communication path between the first component and the second component from the cluster based on the signature; and
a transmission module configured to transmit the command between the first component and the second component through the secure communication path.

9. The system according to claim 8, wherein the signature module is further configured to:
prevent a transmission and an execution of another command associated with the first component in response to a determination that the other command lacks a signature.

10. The system according to claim 8, wherein the signature module is further configured to:
generate the signature using a system key to sign a public key and the class of the first component;
transmit the signature back to the first component with the system key;
store the signature in the system;
activate a predetermined setting to disregard another join request from the first component; and
enable the first component to operate within the system.

11. The system according to claim 8, wherein the virtual private network module is further configured to:
form an encrypted virtual private network (VPN) tunnel within which to establish the secure communication using the public key, a private key of the first component, and another private key of the second component from the cluster.

12. The system according to claim 8, the class verification module is further configured to:
match the class to a predetermined list of expected classes including: a critical operation class, an entertainment class, an environment class, and a peripheral class.

13. The system according to claim 12, wherein the critical operation class includes at least one of: an accelerator unit, a brake unit, a steering unit, and a cruise control unit.

14. The system according to claim 12, wherein the entertainment class includes at least one of: a CD player, a DVD player, a cassette player, a navigation unit, a speaker system, and a display unit.

15. The system according to claim 12, wherein the environment class includes at least one of: an air conditioning unit, a seat heater unit, a seat cooler unit, a window control unit, and a sun shade control unit.

16. The system according to claim 12, wherein the peripheral class includes at least one of: a lighting control unit, a sunroof control unit, and a turn signal control unit.

17. A controller of a vehicle configured to establish secure communications to manage components of the vehicle, the controller comprising:
a memory configured to store instructions; and
a processor coupled to the memory, the processor executing an application in conjunction with the instructions stored in the memory, wherein the application is configured to:
receive a request to join a first component to a cluster of components by the controller;
verify the first component based on a class of the first component by matching the class to a predetermined list of expected classes;
generate a signature using a system key to sign a public key and the class of the first component;
mark a command from the first component with the signature;
establish a secure communication path between the first component and a second component from the cluster based on the signature;
transmit the command between the first component and the second component through the secure communication path; and
prevent a transmission and an execution of another command associated with the first component in response to a determination that the other command lacks the signature.

18. The controller according to claim 17, further comprising:
restrict a type of command that the first component is allowed to send to the second component belonging to a class different from the class of the first component.

19. The controller according to claim 17, further comprising:
form an encrypted virtual private network (VPN) tunnel within which to establish the secure communication path using the public key, a private key of the first component, and another private key of the second component.

20. The controller according to claim 17, further comprising:
store the system key to generate the signature;
detect the request in response to an installation of the first component;
receive the public key and the class of the first component within the request; and
determine the class to match the predetermined list of expected classes.

21. The controller according to claim 20, further comprising:
transmit the signature back to the first component;
store the signature;
activate a predetermined setting to disregard another join request from the first component; and
enable the first component to operate within an operational control system.

22. The controller according to claim 17, further comprising:
match the class to the predetermined list of expected classes including: a critical operation class, an entertainment class, an environment class, and a peripheral class.

* * * * *

UNITED STATES PATENT AND TRADEMARK OFFICE
CERTIFICATE OF CORRECTION

PATENT NO. : 9,559,850 B2  
APPLICATION NO. : 14/967395  
DATED : January 31, 2017  
INVENTOR(S) : Lorge Page 1 of 1

It is certified that error appears in the above-identified patent and that said Letters Patent is hereby corrected as shown below:

On the Title Page

In item (71), under "Applicant", in Column 1, Lines 1-3, delete "EMPIRE TECHNOLOGY DEVELOPMENT LLC, Wilmington (DE)" and insert -- EMPIRE TECHNOLOGY DEVELOPMENT LLC, Wilmington DE (US) --, therefor.

In the Specification

In Column 1, Line 4, delete "CROSS REFERENCE TO RELATED APPLICATIONS" and insert -- CROSS-REFERENCE TO RELATED APPLICATIONS --, therefor.

In Column 1, Line 7, delete "§120" and insert -- § 120 --, therefor.

In Column 1, Line 10, delete "§371" and insert -- § 371 --, therefor.

In Column 1, Line 52, delete "duster based" and insert -- cluster based --, therefor.

Signed and Sealed this  
Eleventh Day of April, 2017

Michelle K. Lee  
*Director of the United States Patent and Trademark Office*